R. L. MAPSON.
VEHICLE TRAILING DEVICE.
APPLICATION FILED MAY 16, 1914.

1,174,018.

Patented Feb. 29, 1916.

Witnesses
Grove E. Herrmann
Elmer E. Rodabaugh

Inventor
ROBERT L. MAPSON
by A. B. Bowman,
Attorney.

UNITED STATES PATENT OFFICE.

ROBERT L. MAPSON, OF LA MESA, CALIFORNIA, ASSIGNOR OF ONE-HALF TO LORENZO SPERBECK, OF LA MESA, CALIFORNIA.

VEHICLE-TRAILING DEVICE.

1,174,018.  Specification of Letters Patent.  Patented Feb. 29, 1916.

Application filed May 16, 1914. Serial No. 839,019.

*To all whom it may concern:*

Be it known that I, ROBERT L. MAPSON, a citizen of the United States, and a resident of La Mesa, in the county of San Diego and State of California, have invented certain new and useful Improvements in Vehicle-Trailing Devices, of which the following is a specification.

My invention relates to devices for coupling two or more vehicles together for trailing the rear ones, which are provided with means for steering the same.

The objects of my invention are, first, to provide a trailing device that is so constructed that it is adjustable throughout, thus making it readily applicable to various makes of vehicles; second, to provide such a device that is simple of construction, durable, easily installed and easily handled, and third, to provide such a device that may be readily applied and is so accurate in its operation that a plurality of vehicles may be trailed one behind the other so that the hind wheels of each vehicle will trail the hind wheels of the front vehicle at all times.

Figure 1:
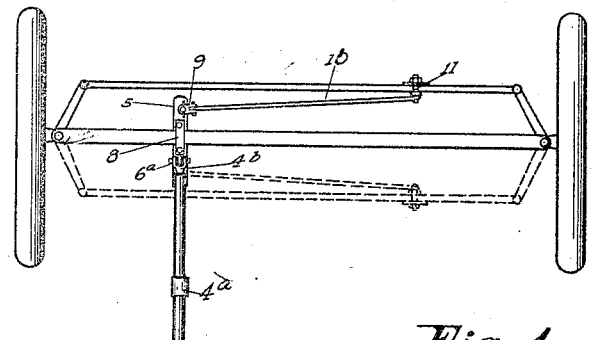
Figure 2:
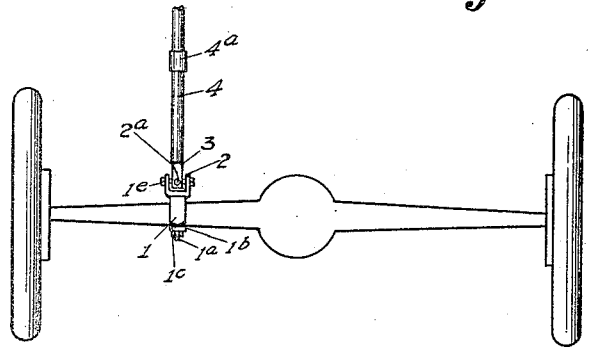
Figure 2:
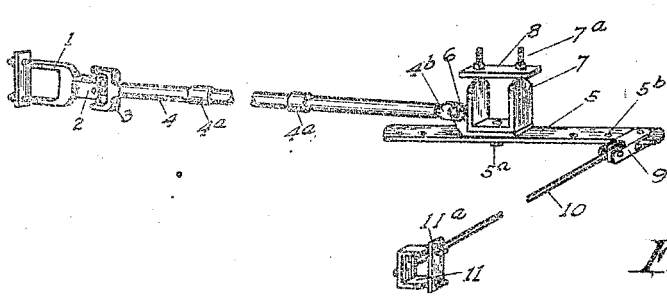

With these and other objects in view, as will appear hereinafter, my invention consists of certain novel features of construction, combination and arrangement of parts as will be hereinafter described in detail and particularly set forth in the appended claims, reference being had to the accompanying drawings and to the characters of reference thereon which form a part of this specification, in which:

Figure 1 is a plan view of the rear axle of a trailed vehicle and the front axle of the trailing vehicle, showing my device mounted thereon and showing, by dotted lines, the position of the steering rod connection when the steering rod is in front of the axle instead of behind; and Fig. 2 is a perspective view of my device complete, disconnected from the vehicles.

Similar characters of reference refer to similar parts throughout the several views.

The clamp piece 1, U-piece 2, yoke 3, pipe 4, lever 5, lug piece 6, U-piece 7, cross bar 8, connecting piece 9, rod 10 and steering rod clamp 11, constitute the principal parts of my device.

The clamp piece 1 is adapted to fit over the outer surface of the rear axle and is provided with two threaded extensions $1^a$ over which is mounted a cross piece $1^b$ and fastened by means of nuts $1^c$, thus making it adapted to different sized and shaped axles. On this clamp piece 1 is mounted the U-piece 2 by means of a swivel joint. Pivotally mounted in this U-piece is the yoke 3 by means of the bolts $2^a$ and $1^e$, the clamp piece, U-piece 2, and yoke 3 forming a universal joint between the rear axle and the pipe 4. This nut is adapted to screw into the end of the pipe 4 which is an ordinary one-half inch or three-quarter inch pipe made in a plurality of sections and connected by means of pipe couplings $4^a$ so that the length of the pipe 4 may be increased or decreased by different length pipes, as desired. Mounted on the other end of the pipe 4 is a bifurcated piece $4^b$ which is pivotally mounted on the lug piece 6 by means of a bolt $6^a$. It will be noted that this lug piece 6 extends between the U-piece 7 and the lever 5, but it may be made of casting and become a portion of the lever 5, if desired. It is rigidly secured to the piece 5 so that any movement of the lug piece 6 will move the lever 5. Pivotally secured to this lug piece 6, on its upper surface, is the U-piece 7 which is adapted to fit over the front axle of the vehicle, and the cross bar 8 mounted on the extended and threaded ends $7^a$ form a clamp upon the front axle of the trailing vehicle. This clamp may be clamped so that the lever is below the axle or reversed so that the lever is above the axle, to suit the convenience and application to different makes of vehicles. The lever 5 is rigidly secured to the lug piece 6 so that it pivots on the U-piece 7 by means of the bolt $5^a$. This lever is provided in each of its ends with a plurality of holes $5^b$ adapted for adjustment so that there may be a proper thrust of the rod 10 with the relative movement of the rear axle of the trailing vehicle. Vertically pivoted on this lever is the connecting piece 9 which is readily detachable therefrom, and horizontally pivoted in this connecting piece 9 is one end of the rod 10. On the other end of the rod 10 is provided a U-shaped clamp 11 which is provided with a cross piece $11^a$ adapted for clamping that end of the rod 10 to the steering rod of the trailing vehicle.

I am aware that trailing devices have been made for the purpose of trailing one vehicle behind another; but I am not aware of a device of this class so constructed that it is adjustable so that it is applicable to the different makes of vehicles, and which may be so adjusted that several vehicles of different makes may be trailed, one behind the other, by the use of several of these devices, so that the rear wheels of each trailing vehicle will follow the rear wheels of the trailed vehicle without any modification in the construction.

Having thus described my invention, what I claim as new and desire to secure by Letters Patent is:

1. In a vehicle trailing device, the combination of a clamp piece, a U-piece swivelly connected thereto and a yoke piece pivotally connected to said U-piece, a rod secured to said yoke, a lug piece pivotally secured to said rod, a lever provided with a plurality of holes in each of its ends, horizontally and centrally pivoted to said lug piece, a clamp piece secured to said lug piece, a rod mounted in one of the holes of said lever so as to be readily removed to the other holes therein and a clamp piece pivoted vertically at its other end adapted to clamp on the steering rod of a traveling device.

2. In a vehicle trailing device, the combination of a clamp member, a U-piece swivelly secured to said clamp member, a yoke pivotally secured to said U-piece, a pipe formed in sections secured to said yoke, a lug pivotally secured on a yoke axis to said rod, a clamp member secured to said lug, a lever provided with a plurality of holes in each of its extended ends pivoted on a vertical axis to said lug and clamp, a piece adapted to be readily pivoted in any of the holes in said lever, a rod horizontally pivoted thereto and a clamp horizontally pivoted to the other end of said rod whereby said trailing device may be readily secured to vehicles with the steering rod either in front or behind the front axle and is readily adjustable to different types and styles of vehicles.

In testimony whereof, I have hereunto subscribed my name in the presence of two subscribing witnesses.

ROBERT L. MAPSON.

Witnesses:
ELMER E. RODABAUGH,
MINNIE KORTE.